Aug. 14, 1956 C. E. LOMAX 2,759,048

TWO PARTY TIMED AND PERIODIC METERING

Filed Sept. 15, 1950 2 Sheets-Sheet 1

INVENTOR.
CLARENCE E. LOMAX

BY Chas. L. Cardy

ATTORNEY

Aug. 14, 1956

C. E. LOMAX 2,759,048

TWO PARTY TIMED AND PERIODIC METERING

Filed Sept. 15, 1950

2 Sheets-Sheet 2

INVENTOR.
CLARENCE E. LOMAX

BY

ATTORNEY

United States Patent Office 2,759,048

Patented Aug. 14, 1956

2,759,048

TWO PARTY TIMED AND PERIODIC METERING

Clarence E. Lomax, Chicago, Ill., assignor to Automatic Electric Laboratories, Inc., Chicago, Ill., a corporation of Delaware Application September 15, 1950, Serial No. 185,065

7 Claims. (Cl. 179—85)

The present invention relates to a system for metering a two-party line in a telephone system.

The object of this invention is to provide a two-party metering system in which an extra cam in the dial of one of the party-line subscribers serves to control the meter selection.

Another object of the invention is to provide a two-party metering system in which a relay located in the trunk circuit controls the meter selection in response to the dial pulses.

A further object of the invention is to provide party-line metering in which all relays required for meter selection are in the trunk equipment rather than in the line equipment.

A further feature of the invention is to provide a circuit in which there will be no dial tone during dialing.

A feature of the invention is a two-party-line metering system which will register only at certain periods of the day, which will give repeated metering for long conversations, and in which the timing may be adjusted to give a longer metering period during the times of the day when business is slack.

The novel features believed to be characteristic of the invention are set forth in the appended claims. The invention, both as to its organization and method of operation, together with further objects and features will best be understood by referring to the following specification taken in connection with the accompanying drawings, in which Fig. 1 and Fig. 2, when placed side by side with Fig. 1 at the left, illustrates a single embodiment of the invention.

Figure 1:
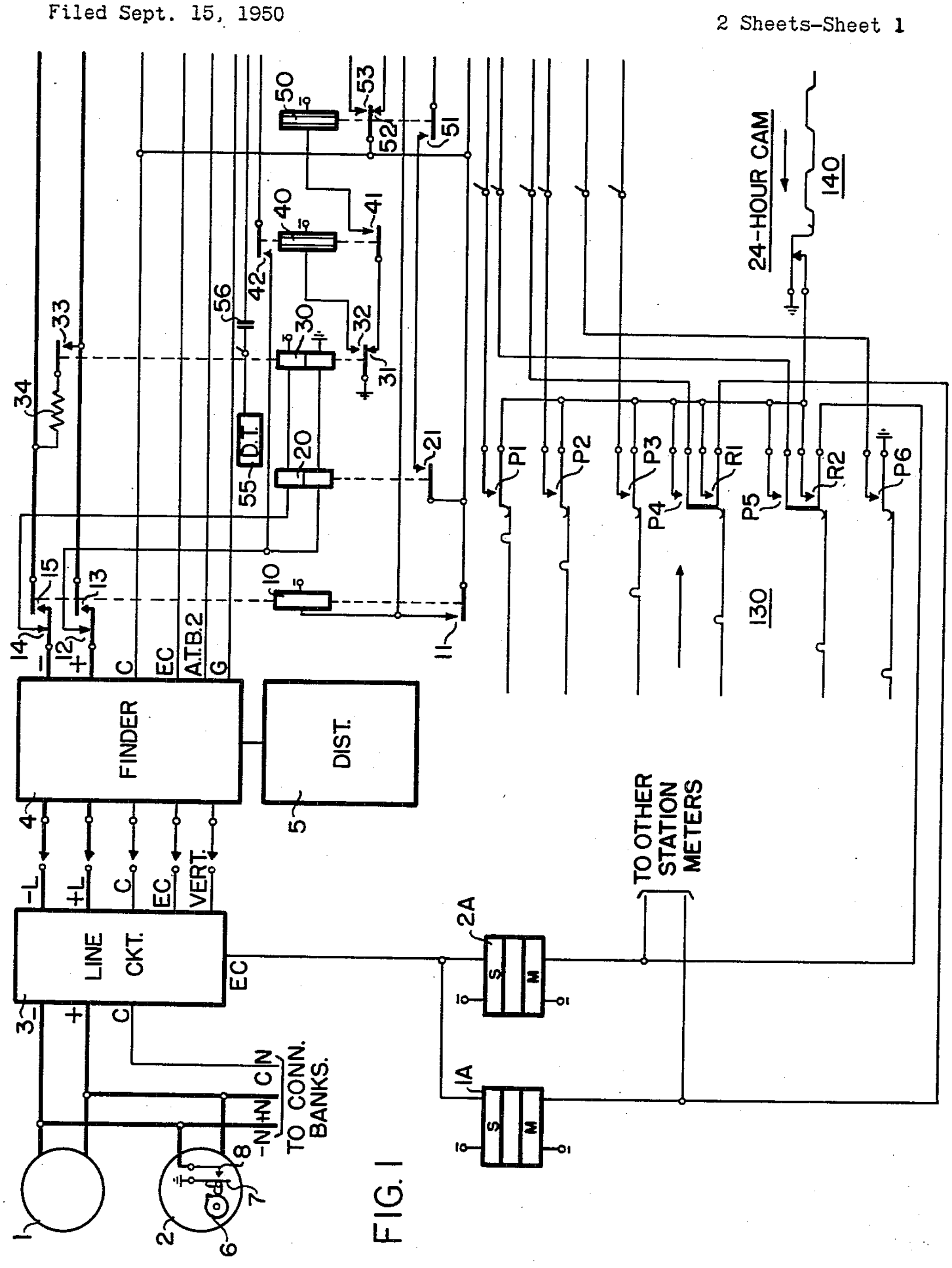

In Fig. 1 a pair of party line subscribers 1 and 2 are shown at the upper left. These subscribers are connected to the same line which in turn is connected to a line circuit 3. The line circuit 3 is the standard type generally associated with finder equipment and is therefore shown in block form.

The line circuit 3 is accessible to a linefinder 4 which has a distributor 5 associated therewith. The linefinder 4 may be of the standard type with an extra control lead EC which is used in connection with the metering system of this invention. The linefinder 4 is connected to a selector 117 by the usual leads found in an automatic system and which are designated —L, +L, C, ATB (all trunks busy), and G (guard). The selector 117 is in turn accessible to a connector 118 which completes a call to the subscriber 119 through a line circuit 119*a*. The selector 117, the connector 118, the line circuit 119*a*, and the subscriber 119 are shown in block form since the mechanical equipment associated therewith is standard in all respects.

The remaining circuits shown in the figures are used in the metering arrangement which is the subject of this invention. In addition to a plurality of relays this equipment includes a pair of meters 1A and 2A, a constantly rotating cam set 130, a 24-hour cam 140, and a timing motor 150 which is stepped by a motor magnet 151.

The operation of the metering equipment will now be described by tracing its operation with reference to calls initiating from the subscribers 1 and 2.

The telephone instrument of the subscriber 1 is of the standard type used in an automatic system. The instrument of the subscriber 2 is slightly different from standard. The standard dial, such as shown in United States Patent No. 1,642,822 granted to H. F. Obergfell on September 20, 1927, absorbs or cancels the last pulse of a series due to the greater space between the number one finger hole and the finger stop. The modification of this dial consists of equipping the finger plate shaft with an extra cam 6 which operates an extra pair of make contact springs 7 and 8 as the dial is turned and restored. The extra make contacts 7 and 8 ground the line during the time the last pulse of a series is being cancelled.

If the subscriber number 2 initiates the call, the turning of the dial preparatory to sending of pulses will momentarily ground the line. The length of time this ground is applied is dependent upon the speed at which the dial is turned. When a call is initiated at the subscriber 2 station the return of the dial interrupts the circuit to a relay 30 which then pulses the selector 117 by completing a loop from conductor +L through the contacts 33, resistance 34 and the conductor —L. The energization of the relay 30 furnishes ground through its contacts 32 for the energization of a slow-to-release relay 40. This operation closes the contacts 41 to prepare a circuit for the operation of a slow-to-release relay 50 as soon as the relay 30 restores between pulses.

The energization of the relay 50 closes its contacts 53 to furnish ground from the C conductor for the operation of a slow-to-release relay 60. After the last pulse has been sent the contact springs 7 and 8 allow the dial to ground the line and thus operate the differential relay 20 which in turn operates a relay 70 through the following circuit: ground, conductor C, contacts 21, contacts 51, relay 70, and battery to ground. The relay 70 then locks through its contacts 73 and prepares a circuit through its contacts 72 which will subsequently effect the operation of a meter 2A to record the call initiated by the subscriber 2.

The time that the line is grounded to operate the relay 20 is roughly the time of one open pulse period. During the period this ground is being applied to the line, the relay 30 must hold operated from its negative winding but this is not difficult because it has previously been operated and well saturated through its two windings and the shunting of the positive winding tends to delay its release.

At the end of the pulse period representing the first digit the relay 50 restores to complete the following circuit for the operation of a relay 10: ground, conductor C, contacts 52, contacts 61, relay 10 and battery to ground. The relay 10 now locks to ground through its contacts 11 and conductor C. Shortly after the relay 50 restores the relay 60 also restores.

As soon as the relay 40 operated its contacts 42 closed to introduce dial tone from a source 55 to the line. The subsequent operation of the relay 60 opened this dial tone circuit at the contacts 62. The operation of the relay 10 closes its contacts 13 and 15 to switch the trunk line conductors from the relays 20 and 30 direct to the switch train so that all switches other than the first selector are pulsed directly from the dial instead of from repeated pulses through the contacts 33 of the relay 30. Once the relay 10 has operated dial tone from the source 55 cannot enter the calling circuit momentarily during dialing operations.

The relay 10 switches the —L and +L conductors through make contacts 13, 15 before contacts 12, 14 break so as not to open the line circuit momentarily while switching. Thus the relays 20 and 30 are momentarily in parallel with the pulsing relay in the switch train. The relay 30, when it is operated, closes the trunk loop through the resistance 34 instead of closing it direct. One of the purposes of this resistance 34 is to avoid removing current from the telephone during the switching process and in this manner avoid giving the calling subscriber a disagreeable noise in his receiver. The dial continues to ground the line momentarily at the end of each dialled digit and this ground is now received by the pulsing relay in the switch train. There is no purpose in the ground being completed after the first digit has been dialled but it does no harm and therefore no effort is made to change the apparatus in order to remove it.

Had the call been initiated at station number 1 the dial would not have applied ground and therefore the relays 20 and 70 would not have operated. The failure of the relay 70 to operate results in the selection and operation of the meter 1A in a manner to be fully explained hereinafter.

Figure 2:
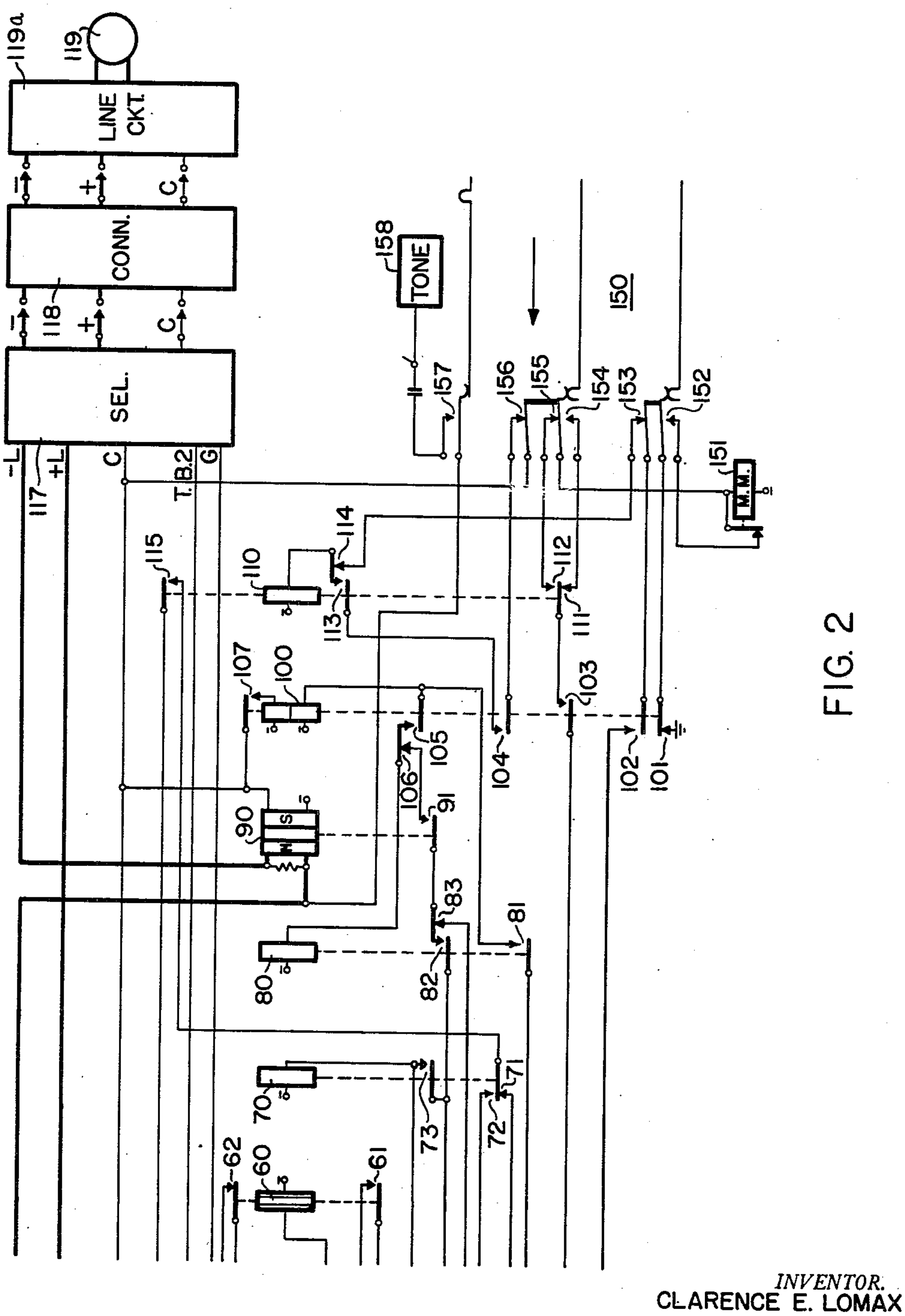

A shunt field polar relay 90 has its winding shown at the right in Fig. 2 energized by local current when the trunk is seized. When relay 10 energizes the winding shown at the left in Fig. 2 is receiving current in series with the line. At this point the two windings are so poled that the relay does not operate. When the called party 119 answers, the line current is reversed and the relay 90 is energized. The contacts 91 are then closed. When the cam set 130, which is constantly rotating, now furnishes a pulse through its P1 contacts the following circuit is completed for the operation of a relay 80: ground, 24-hour cam, contacts P1, contacts 83, 91, and 106, relay 80 and battery to ground. When the relay 80 operates it closes its contacts 81 to complete the following circuit for the operation of a relay 100 since the cam set 130 has closed its P2 contacts: ground, 24-hour cam, contacts P2, 81, lower winding of relay 100 and battery to ground.

After it has operated the relay 100 maintains the relay 80 operated for an interval by an alternative circuit through the contacts 105 and 81. The operation of the relay 100 closes its contacts 102 to complete the following circuit for the operation of a relay 110 at the time the cam 130 closes its contacts P3: ground, 24-hour cam, contacts P3, contacts 102, contacts 153 of the timer 150, contacts 114, relay 110, and battery to ground. As soon as it operates the relay 110 breaks its initial operating circuit but is held through its contacts 113, the contacts 104, the contacts 156 of the timer 150 and conductor C, which is grounded.

The system is now set up for metering and whichever one of meters 1A and 2A is operated depends upon the operation or non-operation of the relay 70. As previously stated the relay 70 is operated if the call originated from the station of subscriber 2, while it was not operated if the call originated from the station of subscriber 1.

Let it be assumed that a call was originated by subscriber 2 resulting in the energization in the relay 70. The contacts 72 will now be closed. When the cam set 130 now advances to close its P4 and R1 contacts the following circuit will be completed for the energization of the lower winding of the meter 1A as it is shown in Fig. 1: ground, 24-hour cam, contacts R1, lower winding of meter 1A, and battery to ground. The meter 1A does not operate since both windings must be energized. The contacts 71 are open and consequently the closure of the P4 contacts is not effective to energize the upper winding of the meter 1A.

When the cam set 130 advances to close its contacts P5 and R2 the following circuit is completed for the energization of the lower winding of the meter 2A as it is shown in Fig. 1: ground, 24-hour cam, contacts R2, the lower winding of the meter 2A, and battery to ground. At the same time the following circuit is completed for the energization of the upper winding of the meter 2A: ground, 24-hour cam, contacts P5, contacts 72, contacts 115, conductor EC, linefinder 4, line circuit 3, conductor EC, the upper winding of meter 2A, and battery to ground. It will be noted that the upper winding of the meter 1A is also energized but since the lower winding is no longer energized the meter 1A will not be operated.

The meters 1A and 2A must have a shunt field for the two cores. They may be used in connection with any of a wide variety of recording means, such as recording tapes, dials or other registering mechanisms (not shown).

After the cam set 130 has advanced to send the P5 pulse to operate the meter 2A it advances further to close the P6 contacts to step the motor magnet 151 of the timer 150 by the following circuit: ground, contacts P6, contacts 103, contacts 112, contacts 155, motor magnet 151 and battery to ground. The timer 150 advances and its cams close the contacts 152 and 154 and open the contacts 153, 155 and 156. The relay 110 now restores since its circuit is broken at the contacts 156. The opening of the contacts 153 prevents the subsequent reoperation of the relay 110 when the contacts P3 are closed upon further operation of the cam 130. The motor magnet 151 continues to be stepped each time the P6 contacts are closed by the following circuit: ground, contacts P6, contacts 103, contacts 111, contacts 154, motor magnet 151 and battery to ground. After a pre-set interval the motor magnet 151 will advance a timer cam to a position to close the contacts 157. This will introduce a warning tone from a source 158 to alert the parties when their conversation time is about to expire.

If the parties hang up the meter will not re-operate. If they do not hang up, the timer will rotate to the normal position shown in Fig. 2 and its cams will position the contact springs as shown so that the relay 110 will re-operate and close its contacts 115 and the meter will again be operated. This process of metering continues throughout the conversation.

The above statement regarding the operation of the meters 1A and 2A was made on the assumption that the 24-hour cam 140 had its contact springs closed so as to furnish ground for the P1 and P5 contacts of the cam 130. The 24-hour cam 140 opens its contacts during certain times as shown so that during slack periods of the day subscribers are allowed to make unmetered calls.

The cams 130 are mounted on a common shaft (not shown) and may be driven in any desired manner by known devices. This arrangement determines the length of conversation time before the tone 158 comes on to warn the subscribers of repeated metering and encourages subscribers to choose the non-busy periods of the day for long conversations.

If a call is made during the portion of the day when no charge is to be made the 24-hour cam 140 will have ground removed from all of the contacts of the cam set 130 except the P6 contacts. In this way if the metering has stopped during the time a conversation is taking place the P6 contacts will close to give a warning tone but further metering will not take place since the P1 to P5 contacts are now of no effect.

In the circuit illustrated in the drawing dial tone from a source 55 is completed through the contacts 42 of the relay 40. Upon the subsequent operation of the relay 60 the contacts 62 are opened to terminate the dial tone.

While it is necessary to have a meter for each subscriber's telephone the 24-hour cam 140 and the cam set 130 may be made common to a number of party lines. Each party line must have access to a plurality of relay equipments 10 to 110 and timers 150 but the number of such relays and timers is less than the number of lines.

While there has been described what is at present considered to be the preferred embodiment of the invention, it will be understood that various modifications may be made therein, and it is contemplated to cover in the appended claims all such modifications as being fully within the true spirit and scope of the invention.

What is claimed is:

1. In an automatic telephone system, a line, two subscribers' telephones connected to said line, a pulsing dial in the circuit of each of said telephones, means in one of said dials in one of said subscribers' telephone for sending a ground pulse during the sending of loop pulses, a trunk circuit accessible to said line, means for connecting said line to said trunk circuit in response to the initiation of a call from either of said subscribers' telephone, a meter selecting relay in said trunk circuit, a circuit for energizing said meter selecting relay, said circuit being completed and said relay being operated only on calls initiated from said one subscriber's telephone in response to said line being momentarily grounded by the operation of said one dial during the setting up of said call from said one subscriber's telephone, two meters, and circuits including contacts on said meter selecting relay for energizing only one of said meters corresponding to said one subscriber in case said meter selecting relay is operated and only the other of said meters in case said meter selecting relay is not operated in response to said call being answered.

2. In an automatic telephone system, a line, two subscribers' telephones connected to said line, a pulsing dial in the circuit of each of said telephones, a cam associated with the dial of one of said telephones, cam springs actuated by said cam for sending a ground pulse during the sending of loop pulses, a trunk circuit accessible to said line, means for connecting said line to said trunk circuit in response to the initiation of a call from either of said subscriber's telephone, a meter selecting relay in said trunk circuit, a circuit for energizing said meter selecting relay, said circuit being completed and said relay being operated only on calls initiated from said one subscriber's telephone in response to said line being momentarily grounded by the operation of said one dial, two meters, and circuits including contacts on said meter selecting relay for energizing only one of said meters corresponding to said one subscriber in case said meter selecting relay is energized and only the other of said meter in case said meter selecting relay is not energized in response to said call being answered.

3. In an automatic telephone system, a line, two subscribers' telephones connected to said line, a pulsing dial in the circuit of each of said telephones, means in one of said dials for sending a ground pulse during the sending of loop pulses, a trunk circuit accessible to said line, means for connecting said line to said trunk circuit, a meter selecting relay in said trunk circuit, a circuit for energizing said meter selecting relay when said line is momentarily grounded by said dial, a pair of meters, two windings for each of said meters both of which must be energized in order for said meters to operate a first set of cam contacts closed at predetermined intervals, a second set of cam contacts closed at different predetermined intervals, and circuits through contacts of said meter selecting relay and said sets of cam contacts for simultaneously energizing both windings of one of said meters when said selecting relay is operated, and for simultaneously energizing both windings of the other of said meters when said meter selecting relay is not operated, whereby only one of said meters is operated dependent upon the operated or non-operated condition of said meter selecting relay.

4. In an automatic telephone system, a line, two subscribers' telephones connected to said line, a pulsing dial in the circuit of each of said telephones, means in one of said dials in one of said subscribers' telephones for sending a ground pulse during the sending of loop pulses, a trunk circuit accessible to said line, means for connecting said line to said trunk circuit in response to the initiation of a call from either of said subscribers' telephones, a meter selecting relay having a first and a second set of contacts in said trunk circuits, a circuit for energizing said meter selecting relay, said circuit being completed and said relay being operated only on calls initiated from said one subscriber's telephone in response to said line being momentarily grounded by the operation of said one dial, two meters, a set of constantly operating cams, a plurality of contacts closed in succession during each operating cycle of said cam set, a first circuit including the first set of said relay contacts connected in series with the first of said plurality of successively closed cam contacts for energizing only one of said meters in case said relay is operated, and a second circuit including the second set of said relay contacts connected in series with the second of said plurality of successively closed contacts for energizing only the other of said meters in case said relay is not operated.

5. In an automatic telephone system, a line, two subscribers' telephones connected to said line, a pulsing dial in the circuit of each of said telephones, means in one of said dials in one of said subscriber's telephone for sending a ground pulse during the sending of loop pulses, a trunk circuit accessible to said line, means for connecting said line to said trunk circuit in response to the initiation of a call from either of said subscriber's telephone, a meter selecting relay in said trunk circuit, a circuit for energizing said meter selecting relay, said circuit being completed and said relay being operated only on calls initiated from said one subscriber's telephone in response to said line being momentarily grounded by the operation of said one dial, two meters, a set of constantly operating cams, a plurality of contacts closed successively during the operating cycle of said cams, circuits including contacts on said meter selecting relay included in series with different ones of said plurality of cam set contacts for energizing said meters in response to the call being answered, only one of said meters being operated in case said meter selecting relay is operated and only the other of said meters being operated in case said meter selecting relay is not operated, and a timer advanced by closure of another one of the contacts of said came set to provide repeated metering of long conversations.

6. In an automatic telephone system, a line, subscribers' telephones connected to said line, two station meters for said line, a selector accessible to said line, an auxiliary circuit associated with said selector having means for connecting a source of dial tone to said line when seized, a line relay in said auxiliary circuit, a meter selecting relay in said auxiliary circuit for selecting one of said two station meters for operation dependent upon its operated or non-operated condition, means controlled by said line relay, when operated in response to impulses from a calling line, for repeating said impulses to said selector, station selecting means including a first slow relay controlled by said line relay during pulsing for controlling the operation of said meter selecting relay in accordance with the station subscriber calling, a second slow relay controlled by said first slow relay during pulsing of said line relay for disconnecting said source of dial tone from said line, and means jointly controlled by said two slow relays after the pulsing of said line relay for disconnecting the line from said auxiliary circuit and connecting the line to said selector.

7. In an automatic telephone system comprising an automatic switch train, a calling party line, a first and a second party on said line, a substation for each party, a pulsing dial in the circuit of each of said substations, means in the dial in one of said substations for sending a ground pulse during the period of sending loop pulses to selectively operate said switch train for extending a connection to a desired called party, a first meter individual to said first party, a second meter individual to said second party, a first and a second winding on each of said meters and said meters being operative only in response to the simultaneous energizations of both their first and second windings, a meter selecting relay, means for operating said relay only in response to the first party operating said one dial and said relay remaining unoperated on calls attempted by said second party upon the operation of said other dial, a first set of cam springs, a second set of cam springs, means for successively operating said first and second sets of cam springs, and matching circuit means including contacts on said relay for simultaneously energizing both windings of said first meter to operate said first meter in response to the operation of said first set of cam springs in case said relay is operated or for simultaneously energizing both windings of said second meter to operate said second meter in response to the operation of said second set of cam springs in case said relay is unoperated.

References Cited in the file of this patent

UNITED STATES PATENTS

| | | |
|---|---|---|
| 2,410,520 | Ostline | Nov. 5, 1946 |
| 2,481,851 | Lomax | Sept. 13, 1949 |
| 2,504,708 | Long | Apr. 18, 1950 |
| 2,532,926 | Lomax | Dec. 5, 1950 |
| 2,535,509 | Ostline | Dec. 26, 1950 |
| 2,535,765 | Voss | Dec. 26, 1950 |
| 2,543,022 | Horowitz | Feb. 27, 1951 |
| 2,566,330 | Horowitz | Sept. 4, 1951 |
| 2,603,712 | Ostline | July 15, 1952 |